(12) United States Patent
Gostrenko et al.

(10) Patent No.: US 8,253,737 B1
(45) Date of Patent: *Aug. 28, 2012

(54) SYSTEM, METHOD, AND COMPUTER PROGRAM PRODUCT FOR GENERATING A DISPARITY MAP

(75) Inventors: Viatcheslav V. Gostrenko, Fremont, CA (US); Mikhail V. Krivega, Fremont, CA (US); David Robert Cook, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 736 days.

This patent is subject to a terminal disclaimer.

(21) Appl. No.: 11/750,288

(22) Filed: May 17, 2007

(51) Int. Cl.
*G06T 15/40* (2011.01)

(52) U.S. Cl. ........................................................ 345/422

(58) Field of Classification Search .................. 345/422; 352/86; 359/462
See application file for complete search history.

(56) References Cited

U.S. PATENT DOCUMENTS

| | | | | |
|---|---|---|---|---|
| 5,673,380 A * | 9/1997 | Suzuki | ........................... | 345/473 |
| 6,198,488 B1 * | 3/2001 | Lindholm et al. | ............ | 345/426 |
| 2005/0190180 A1 * | 9/2005 | Jin et al. | ........................ | 345/419 |
| 2006/0066612 A1 * | 3/2006 | Yang et al. | .................... | 345/419 |

FOREIGN PATENT DOCUMENTS

WO    WO 2007017834 A2 *    2/2007

OTHER PUBLICATIONS

U.S. Appl. No. 11/550,347, filed Oct. 17, 2006.
"2D-plus-Depth format," Philips, copyright 2004-2010 Koninklijke Philips Electronics N.V., http://www.business-sites.philips.com/sites/philipsbs/3dsolutions/3dcontentinterfaceformats/2dplusdepthformat/index.page.
"2D-plus-depth," Wikipedia, last modified on Feb. 1, 2010, http://en.wikipedia.org/wiki/2D-plus-depth.

* cited by examiner

*Primary Examiner* — Aaron M Richer
*Assistant Examiner* — Robert Craddock
(74) *Attorney, Agent, or Firm* — Zilka-Kotab, PC

(57) ABSTRACT

A system, method, and computer program product are provided for generating a disparity map. In use, a z-buffering operation is performed. In addition to such z-buffering operation, a plurality of disparity values are calculated, such that a disparity map may be generated utilizing the disparity values. To this end, such disparity map may be used for displaying stereoscopic content.

18 Claims, 6 Drawing Sheets

SYSTEM, METHOD, AND COMPUTER PROGRAM PRODUCT FOR GENERATING A DISPARITY MAP

FIELD OF THE INVENTION

The present invention relates to display systems, and more particularly to stereoscopic display systems.

BACKGROUND

In stereoscopic display systems, object depth information is required to generate different images intended for viewing by a left and right eye of a viewer. Typically, such depth information is provided to a display system in the form of a depth map that accompanies a two-dimensional image. Prior Art FIG. 1 illustrates an exemplary two-dimensional image 102 accompanied by a depth map 104.

Ideally, the depth information of the aforementioned depth map accurately reflects a distance from the viewer to the object along a depth axis (i.e. z-axis). Current stereoscopic display systems use contents of a z-buffer (i.e. depth buffer, etc.) in place of such depth information.

Unfortunately, the contents of a z-buffer does not exactly correspond with accurate object depth information. For example, z-coordinates are often transformed before being written to the z-buffer. One illustrative transformation is as follows: Z_output=A+B/Z_input, where A and B include constants. Unless A and B are known, it is impossible to recover the accurate depth information of the object from the aforementioned Z_output.

To this end, current stereoscopic display systems are required to rely on inaccurate depth information when generating left and right eye content. This, in turn, results in a reduction in quality from the perspective of the viewer. There is thus a need for addressing these and/or other issues associated with the prior art.

SUMMARY

A system, method, and computer program product are provided for generating a disparity map. In use, a z-buffering operation is performed in addition to such z-buffering, operation, a plurality of disparity values are calculated, such that a disparity map may be generated utilizing the disparity values. To this end, such disparity map may be used for displaying stereoscopic content.

BRIEF DESCRIPTION OF THE DRAWINGS

Prior Art

DETAILED DESCRIPTION

Figure 1:
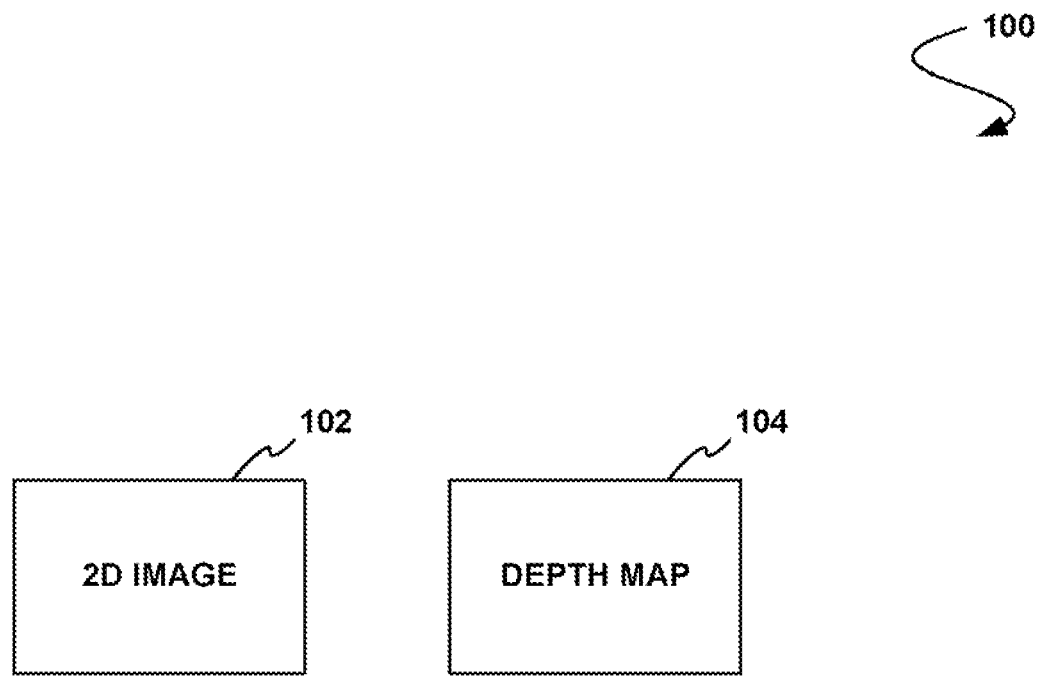
FIG. 1 illustrates an exemplary two-dimensional image and depth map.
Figure 2:
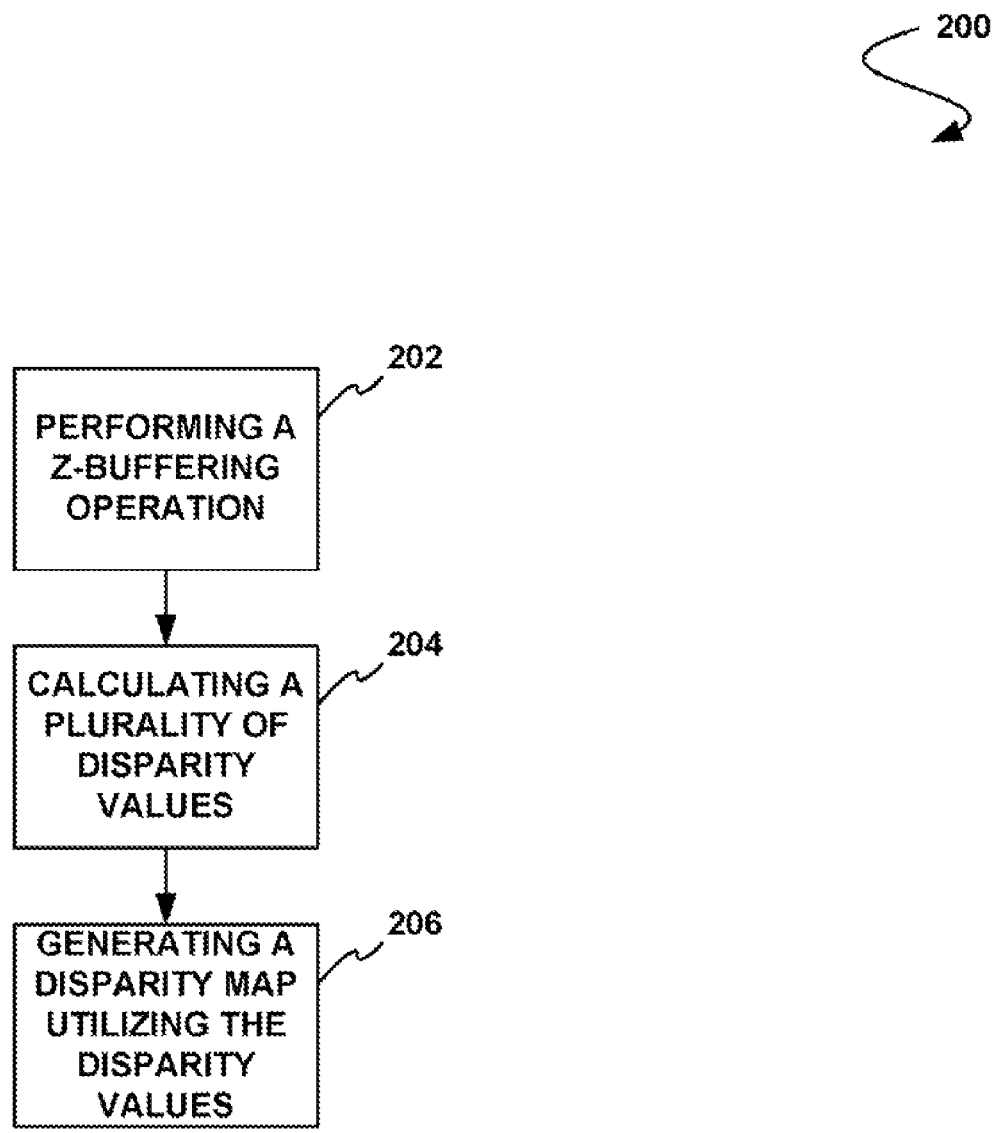
FIG. 2 shows a method for generating a disparity map, in accordance with one embodiment.

FIG. 2 shows a method for generating a disparity map, in accordance with one embodiment. As shown, a z-buffering operation is performed. See operation 202. In the context of the present description, such z-buffering refers to any storage of depth-related information about an object. In one possible embodiment, such depth-related information may include a z-coordinate that is associated with the object on a per-pixel basis. In various embodiments, the z-buffering may be used for hidden surface removal, etc.

In addition, a plurality of disparity values is calculated. See operation 204. In the context of the present description, the disparity values refer to a distance between at least one image (or portion thereof) intended for a first eye and at least one corresponding image (or portion thereof) intended for a second eye, or at least be a function of such distance, in one embodiment, such a distance may be between a point in a single left eye image intended for a left eye and a corresponding point in a single right eye image intended for a right eye. In other embodiments, however, such distance may be between corresponding points in any two of a larger number of images e.g. 3-9, or more). In such embodiment, which of the images is intended for each eye may depend on a viewpoint of a user.

Of course, the disparity values may be calculated in any desired manner. For example, in one embodiment, the disparity values may be calculated for each of a plurality of pixels. In another embodiment, the disparity values may be calculated utilizing a w-value. More information regarding one exemplary technique for calculating the disparity values in such a manner will be set forth hereinafter in greater detail during the description of various embodiments.

To this end, a disparity map may be generated utilizing the disparity values, as indicated in operation 206. In the context of the present description, such disparity map may refer to any data structure that includes a plurality of the disparity values. In one optional embodiment, such disparity map may include coordinates associated with each disparity value, etc. In various other embodiments, the disparity map may or may not be generated in parallel (e.g. simultaneous) with the aforementioned z-buffering of operation 202.

In use according to one embodiment, at least two images may be generated which are adapted for stereoscopic display, utilizing the disparity map. In another embodiment, three or more images may be generated for stereoscopic display. In any case, by using the aforementioned disparity map in such manner in place of a less accurate source of depth information (e.g. a z-buffer, etc.), an accuracy of resultant stereoscopic images may optionally be improved.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
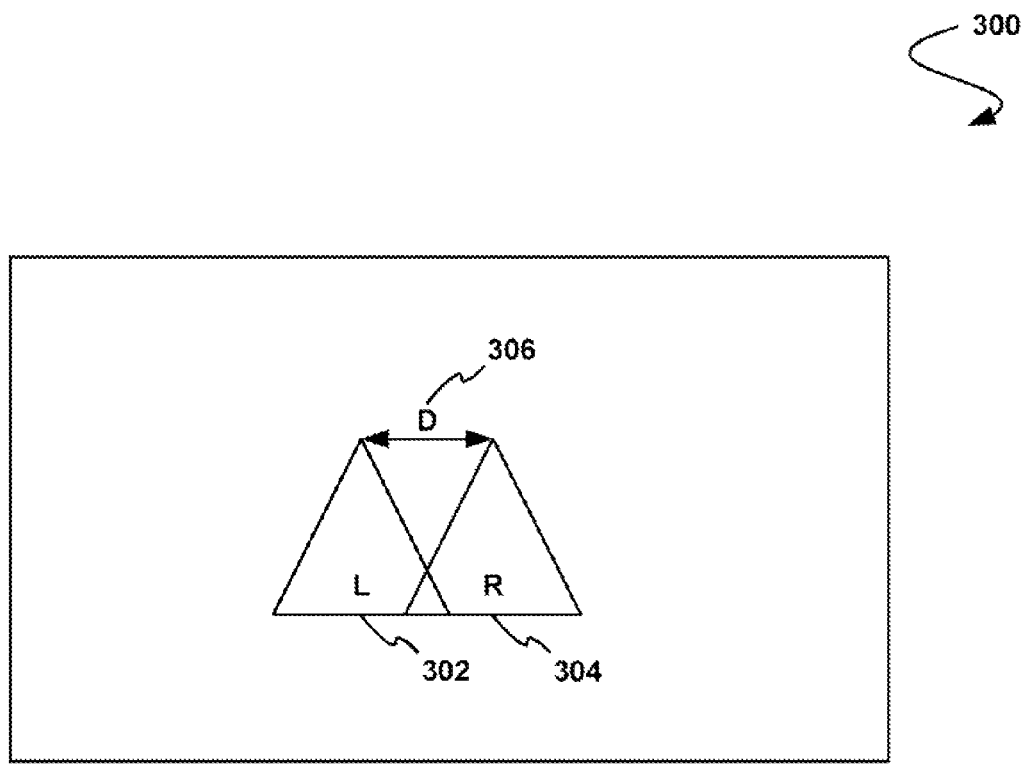
FIG. 3 shows a stereoscopic display illustrating an exemplary disparity value, in accordance with one embodiment.

FIG. 3 shows a stereoscopic display 300 illustrating an exemplary disparity value 306, in accordance with one embodiment. As shown, such disparity value 306 represents a distance between corresponding points of at least one image 302 intended for a first eye and at least one image 304 intended for a second eye. Again, such disparity value 306 is set forth for illustrative purposes only and should not be construed as limiting in any manner. For example, the disparity value 306 may not necessarily be directly representative of such distance, but rather be a function of such distance, etc.

As mentioned earlier, each disparity value may, in one embodiment, be calculated utilizing a w-value (e.g. 1/w- value). For example, in one embodiment, each disparity value may be calculated utilizing the following formula set forth in Table 1.

TABLE 1 disparity value = maximum disparity * (1 − zero separation plane depth * (l/w))

In such formula, the maximum disparity refers to a disparity desired for infinitely far objects. Further, the zero separation plane depth refers to a depth at which it is desired to have zero disparity between left and right eye images. Of course, it should be noted that the formula set forth in Table 1 is presented for illustrative purposes only and should not be construed as limiting in any manner whatsoever.

Figure 4:
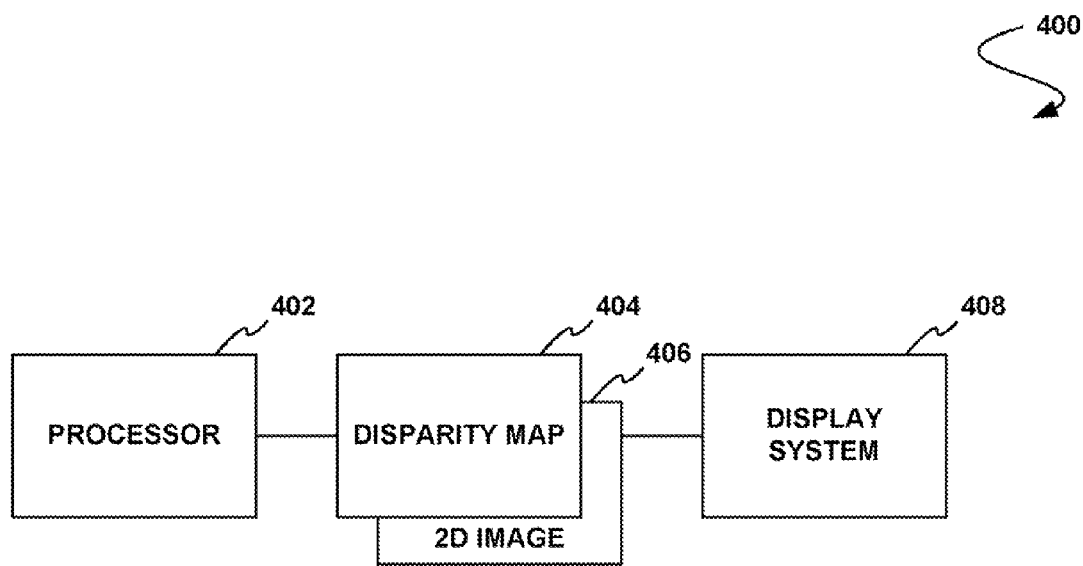
FIG. 4 shows a system for generating a disparity map, in accordance with one embodiment.

FIG. 4 shows a system 400 for generating a disparity map, in accordance with one embodiment. As an option, the present system 400 may be implemented to carry out the method 200 of FIG. 2, for example. Of course, however, the system 400 may be implemented in any desired environment. It should also be noted that the aforementioned definitions may apply during the present description.

As shown, a processor 402 (e.g. a graphics processor, etc.) is provided which may, in one embodiment, be capable of generating a disparity map 404. In one embodiment, such disparity map 404 may be generated utilizing the method 200 of FIG. 2 and/or the techniques set forth in FIG. 3, for example. Accompanying such disparity map 404 may be a two-dimensional image 406, both of which are exposed off the processor 402 in the manner shown.

In one embodiment, the disparity map 404 may include a plurality of disparity values that are related to a corresponding portion (e.g. pixel) of the two-dimensional image 406 by way of a plurality of coordinates (e.g. x, y, z 1/w). Table 2 illustrates an exemplary data structure showing such relation.

TABLE 2

| Coordinate set_1 | Disparity Value_1 |
| Coordinate set_2 | Disparity Value_2 |
| Coordinate set_3 | Disparity Value_3 |

For instance, each pixel in a disparity map may contain a disparity value corresponding to a pixel at the same x, y coordinates in a 2D color image.

Specifically, the disparity map 404 and the two-dimensional image 406 may be passed to a display system 408 which may, in turn, use such information for displaying objects stereoscopically. Specifically, in one embodiment, the display system 408 may generate only two images (e.g. a left eye image and a right eye image) adapted for stereoscopic display, utilizing the disparity map. In another embodiment, the display system 408 may be used to generate three or more images for stereoscopic display, again utilizing the disparity map.

Figure 5:
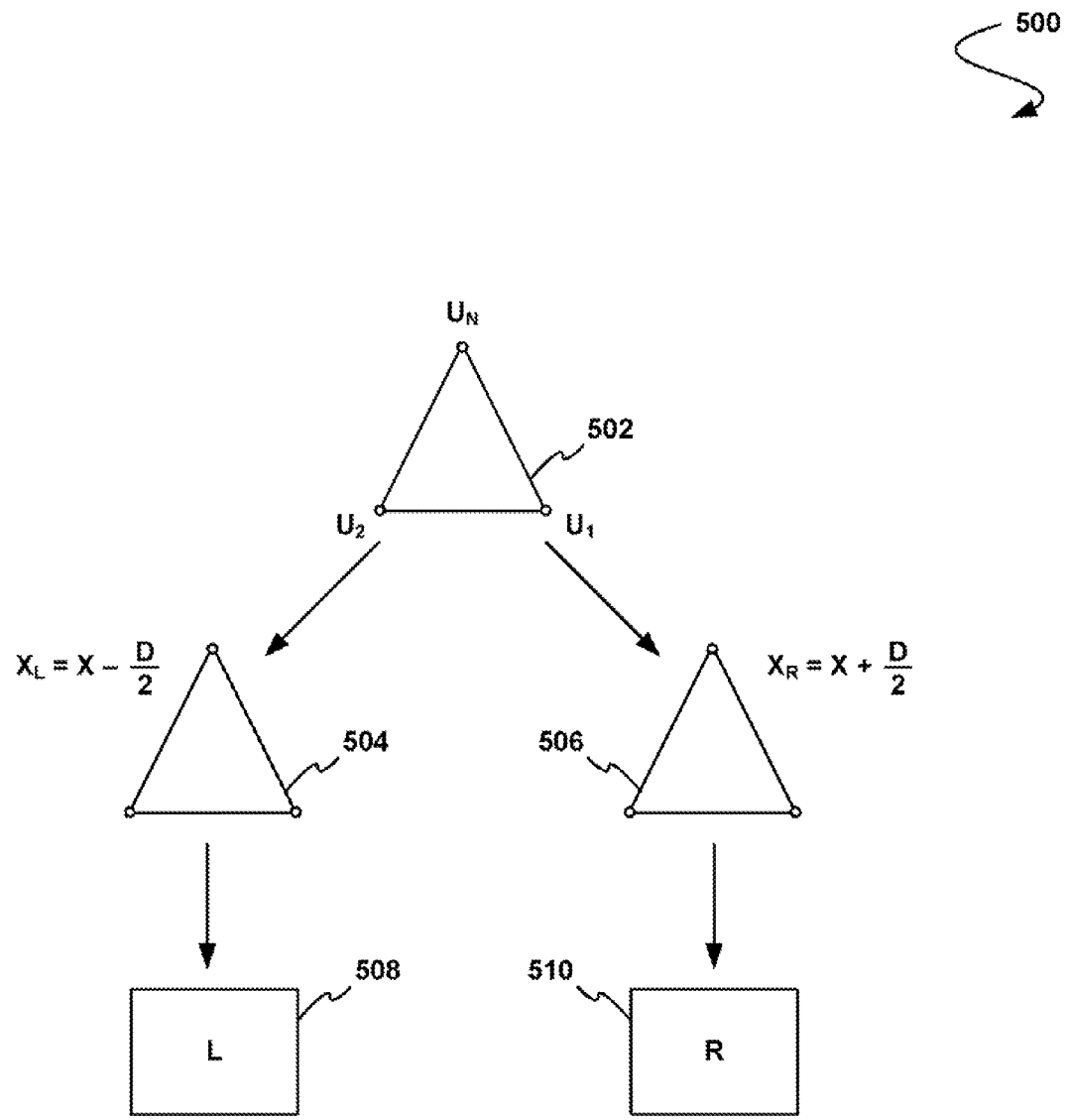
FIG. 5 shows a technique for generating at least two stereoscopic images using a disparity map, in accordance with another embodiment.

More information regarding one technique with which the display system 408 may use the disparity map 404 and the two-dimensional image 406 for such purpose will be set forth during the description of FIG. 5. Further, while the processor 402 and the display system 408 are shown to be separate, it should be noted that such components may be integrated as desired. Still yet, while the processor 402 is shown to calculate and output the disparity map 404 to the display system 408, other embodiments are contemplated where source data (e.g. a plurality of w- or 1/w-values, etc.) may be passed instead of the disparity map 404, such that the data may be utilized by downstream processes for use in generating the disparity map 404.

FIG. 5 shows a technique 500 for generating at least two stereoscopic images using a disparity map, in accordance with another embodiment. As an option, the present technique 500 may be implemented in the context of the functionality and architecture of FIGS. 1-4. Of course, however, the technique 500 may be used in any desired environment. Again, the aforementioned definitions may apply during the present description.

As shown, a portion of an object 502 (e.g. primitive in the form of a triangle, etc.) may be processed for stereoscopic display. In one embodiment, such processing may occur at a display system (e.g. display system 408 of FIG. 4) that resides downstream from a processor (e.g. processor 402 of FIG. 4) where a disparity map and a two-dimensional image are generated. Of course, other embodiments, are contemplated where the object portion 502 may be processed utilizing the disparity map at any location, etc.

With continuing reference to FIG. 5, the portion of the object 502 includes a plurality of vertices. While not shown, each vertex may include a plurality of coordinates (e.g. x, y, z, 1/w). In use, such information may be used to generate at least two images associated with the object portion 502. In particular, an x-coordinate may, for example, be modified for the purpose of generating a left eye instance 504 of such object portion 502 which is suitable for display in conjunction with a left eye image 508, and further generating a right eye instance 506 of such object portion 502 which is suitable for display in conjunction with a right eye image 510, in the manner shown.

Table 3 illustrates exemplary formulas for calculating modified x-coordinate for such purpose.

TABLE 3

$x_L = x_0 - D/N$      $x_R = x_0 + D/N$, where
D = disparity value at corresponding coordinate set
N = 2

It should be noted that the foregoing formulas are specifically set forth for generating a single left eye image and a single right eye image. Of course, other embodiments are contemplated where three or more images may be generated, in which case N=3-9, or more.

Thus, in one embodiment, unmodified x-coordinates may be passed to the display system so that such system may modify the same, as set forth above. To this end, the display system may be afforded flexibility as to how the stereoscopic images are generated (e.g. how many are generated, etc.).

Thus, if it is desired that a two-dimensional image and disparity map with per-pixel disparity values be generated, a first image (e.g. two-dimensional image) may be rendered as an application intended, without modifications of the x-coordinates. Then, a second image (e.g. disparity map) may be generated by sending computed disparity values to a vertex color register. A rendering pipeline may then be set up to render three-dimensional primitives by simply interpolating vertex colors across a surface of the primitive, and writing interpolated color to an output image buffer.

This way, an image may be generated with color intensity of each pixel representing an intended disparity. To this end, use of a conventional depth buffer may be avoided for the purposes of generating stereoscopic images. However, the conventional depth buffer may still be used for other purposes during image generation, such as hidden surface removal. To this end, a disparity map may be generated in a color buffer, while using a conventional depth buffer at the same time.

Figure 6:
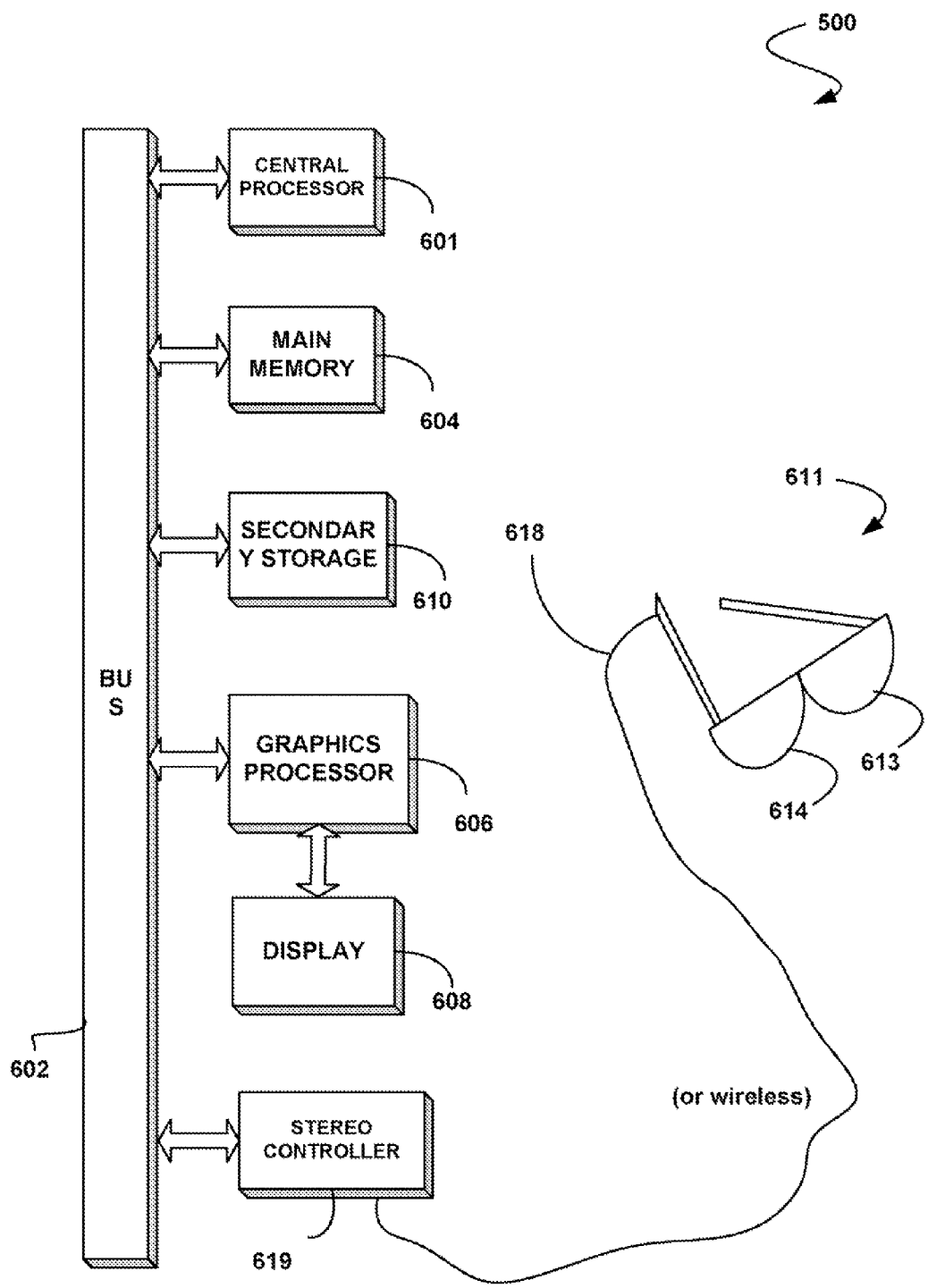
FIG. 6 illustrates an exemplary system in which the various architecture and/or functionality of different embodiments may be implemented.

FIG. 6 illustrates an exemplary system 600 in which the various architecture and/or functionality of different embodiments may be implemented. As an option, the present system 600 may be implemented in the context of the functionality and architecture of FIGS. 1-5. Of course, however, the system 600 may be carried out in any desired environment. Again, the aforementioned definitions may apply during the present description.

As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608. While one system 600 and display 608 are shown in FIG. 6, additional displays may be provided in the context of the present system 600 or other systems, as desired, for carrying out the functionality set forth hereinabove.

In one embodiment, the graphics processor 606 may include a plurality of shader modules, a rasterization module, etc. Each of the foregoing modules may even be situated on a single semiconductor platform to form a graphics processing unit (GPU). In the present description, a single semiconductor platform may refer to a sole unitary semiconductor-based integrated circuit or chip. It should be noted that the term single semiconductor platform may also refer to multi-chip modules with increased connectivity. Of course, the various modules may also be situated separately or in various combinations of semiconductor platforms per the desires of the user. For example, an embodiment is contemplated where a single-chip computer or game console includes an integrated central processor, graphics processor, etc.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In various embodiments, the architecture and/or functionality of the various other figures may be implemented in the context of the host processor 601, graphics processor 606, a chipset (i.e. a group of integrated circuits designed to work and sold as a unit for performing related functions, etc), and/or any other integrated circuit for that matter. Still yet, the architecture and/or functionality of the various figures may be implemented in the context of a general system, a circuit hoard system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices including, but not limited to a personal digital assistant (PDA) device, a mobile phone device, a television, etc.

Further, while not shown, the system 600 may be coupled to a network. [e.g. a telecommunications network, local area network (LAN wireless network, wide area network (WAN) such as the Internet, peer-to-peer network, cable network, etc.) for communication purposes.

As an option, further included may be a pair of stereo glasses 611 capable of being worn on a face of a user. While the stereo glasses 611 are shown to include two elongated members for supporting the same on the face of the user, it should be noted that other constructions (e.g. member-less design, head strap, helmet, etc.) may be used to provide similar or any other type of support. As further shown, the stereo glasses 611 also include a right eye shutter 614 and a left eye shutter 613.

Both the right eye shutter 614 and left eye shutter 613 are capable of both an open orientation and a closed orientation, in use, the open orientation allows more light therethrough with respect to the closed orientation. Of course, such orientations may be achieved by any desired mechanical, electrical, optical, and/or any other mechanism capable of carrying out the above functionality.

For control purposes, the stereo glasses 611 may be coupled to a stereo controller 619 via a cable 618 (or without the cable 618 in a wireless environment). In various embodiments, the stereo controller 619 may reside in any location associated with the system 600, the stereo glasses 611, and/or even in a separate module, particularly (but not necessarily) in an embodiment where the graphics processor 606 is attached to a separate interface [e.g. universal serial bus (USB), etc.] on the system 600. As shown, in one embodiment, the display 608 may be directly connected to the graphics processor 606, and the stereo controller 619 may further be directly connected to the system 600 via a USB interface or any other interface, for that matter. In other embodiments, the stereo controller 619 may be coupled between the graphics processor 606 and the display 608 for carrying out the desired functionality. Of course, the stereo controller 619 may comprise any hardware and/or software capable of the providing such desired functionality.

Specifically, in some embodiments, the right eye shutter 614 and left eye shutter 613 are controlled to switch between the closed orientation and the open orientation. This may be accomplished in any desired manner. Just by way of example, the graphics processor 606 may provide appropriate left/right control signals to the stereo controller 619 over the bus 602, USB interface, etc. While the stereo glasses 611 are shown to be included in the present embodiment, it should be noted that other embodiments are contemplated which do not require such additional gear for affording a stereoscopic display.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   performing a z-buffering operation, utilizing a processor;
   calculating at least two disparity values, a first of the disparity values referring to a first distance between a first pixel of a first image intended for a first eye and a corresponding first pixel of a second image intended for a second eye, and a second of the disparity values referring to a second distance between a second pixel of the first image intended for the first eye and a corresponding second pixel of the second image intended for the second eye;
   generating a disparity map to an output image buffer, utilizing the at least two disparity values, by;

sending the at least two disparity values to a vertex color register,
interpolating the at least two disparity values in the vertex color register, and
writing each of the interpolated values to the output image buffer as a color intensity value, such that the output image buffer contains the disparity map comprising a plurality of color intensity values, each of the color intensity values associated with a corresponding pixel of a two-dimensional image, and each of the color intensity values representing a disparity of the corresponding pixel in the two-dimensional image; and
generating at least two images adapted for stereoscopic display, utilizing the disparity map;
wherein the disparity map is generated in a color buffer, while a separate depth buffer is concurrently used during image generation for hidden surface removal.

2. The method of claim 1, wherein the disparity map is generated utilizing a processor.

3. The method of claim 2, wherein the processor includes a graphics processor.

4. The method of claim 2, wherein the disparity map is passed to a display system.

5. The method of claim 4, wherein the display system generates three or more images for stereoscopic display, utilizing the disparity map.

6. The method of claim 4, wherein the display system generates a plurality of images adapted for stereoscopic display by adjusting x-coordinates, utilizing the disparity map.

7. The method of claim 4, wherein the display system generates a plurality of images adapted for stereoscopic display by adjusting unmodified x-coordinates, utilizing the disparity map.

8. The method of claim 2, wherein the disparity map is passed to a display system with a two-dimensional image.

9. The method of claim 1, wherein the disparity values are calculated utilizing a w-value, and 1/w is a coordinate in a vertex defined by a plurality of coordinates (x, y, z, 1/w).

10. The method of claim 1, wherein the disparity map is generated in parallel with the z-buffering.

11. The method of claim 1, wherein the z-buffering is utilized for hidden surface removal.

12. The method of claim 1, wherein the disparity map is utilized for increasing an accuracy of stereoscopic images.

13. The method of claim 1, wherein the at least two images adapted for stereoscopic display include a left eye image and a right eye image.

14. The method of claim 1, further including avoiding use of a contents of a z-buffer buffer, the z-buffer utilized in performing the z-buffering operation, for generating the at least two images adapted for stereoscopic display utilizing the disparity map.

15. The method of claim 1, further including generating the two-dimensional image prior to generating the disparity map, wherein a color intensity value of each pixel in the output image buffer represents the disparity of the corresponding pixel in the two-dimensional image.

16. A computer program product embodied on a non-transitory computer readable medium, comprising:
computer code for performing a z-buffering operation;
computer code for calculating at least two disparity values, a first of the disparity values referring to a first distance between a first pixel of a first image intended for a first eye and a corresponding first pixel of a second image intended for a second eye, and a second of the disparity values referring to a second distance between a second pixel of the first image intended for the first eye and a corresponding second pixel of the second image intended for the second eye;
computer code for generating a disparity map to an output image buffer, utilizing the at least two disparity values, by:
sending the at least two disparity values to a vertex color register,
interpolating the at least two disparity values in the vertex color register, and
writing each of the interpolated values to the output image buffer as a color intensity value, such that the output image buffer contains the disparity map comprising a plurality of color intensity values, each of the color intensity values associated with a corresponding pixel of a two-dimensional image, and each of the color intensity values representing a disparity of the corresponding pixel in the two-dimensional image; and;
computer code for generating at least two images adapted for stereoscopic display, utilizing the disparity map;
wherein the computer program product is operable such that the disparity map is generated in a color buffer, while a separate depth buffer is concurrently used during image generation for hidden surface removal.

17. An apparatus, comprising:
a processor for:
performing a z-buffering operation,
calculating at least two disparity values, a first of the disparity values referring to a first distance between a first pixel of a first image intended for a first eye and a corresponding first pixel of a second image intended for a second eye, and a second of the disparity values referring to a second distance between a second pixel of the first image intended for the first eye and a corresponding second pixel of the second image intended for the second eye, and
generating a disparity map to an output image buffer, utilizing the at least two disparity values, by:
sending the at least two disparity values to a vertex color register,
interpolating the at least two disparity values in the vertex color register, and
writing each of the interpolated values to the output image buffer as a color intensity value, such that the output image buffer contains the disparity map comprising a plurality of color intensity values, each of the color intensity values associated with a corresponding pixel of a two-dimensional image, and each of the color intensity values representing a disparity of the corresponding pixel in the two-dimensional image;
wherein the apparatus is operable such that the disparity map is generated in a color buffer, while a separate depth buffer is concurrently used during image generation for hidden surface removal.

18. The apparatus of claim 17, wherein the processor is in communication with memory and a display via a bus.

* * * * *

UNITED STATES PATENT AND TRADEMARK OFFICE
CERTIFICATE OF CORRECTION

| | |
|---|---|
| PATENT NO. | : 8,253,737 B1 |
| APPLICATION NO. | : 11/750288 |
| DATED | : August 28, 2012 |
| INVENTOR(S) | : Gostrenko et al. |

It is certified that error appears in the above-identified patent and that said Letters Patent is hereby corrected as shown below:

In the claims:

Claim 1, col. 6, line 67; please replace "by;" with --by:--.

Signed and Sealed this
Ninth Day of April, 2013

Teresa Stanek Rea
*Acting Director of the United States Patent and Trademark Office*